128,169

UNITED STATES PATENT OFFICE.

ELIZABETH PHILLIPS, OF PEORIA, ILLINOIS.

IMPROVEMENT IN MEDICAL COMPOUNDS OR BITTERS.

Specification forming part of Letters Patent No. 128,169, dated June 18, 1872.

*To all whom it may concern:*

Be it known that ELIZABETH PHILLIPS, of Peoria, in the county of Peoria and State of Illinois, has invented a new and valuable Improvement in Medicine-Bitters; and she does hereby declare that the following is a full, clear, and exact description of the same, reference being had to the specification.

This invention has relation to a medical compound for the treatment of diseases of the blood, lungs, liver, kidneys, and spine; and the novelty consists in a compound of ingredients combined in the proportions hereinafter described.

To prepare this medicine I take one gallon of neutral spirits, one and one-half ounce extract of sarsaparilla, two and one-quarter ounces extract of spikenard, two and one-quarter ounces extract of dandelion, two and one-quarter ounces of borevine, two and one-quarter ounces extract of prickly-ash, two ounces extract of yellow-dock, three ounces extract of cherry-bark, two ounces extract of sassafras, one and one-half ounce extract of mandrake, and mix them thoroughly together. I then add one-half pound of white burnt sugar, and the remedy is ready for use.

What I claim as my invention, and desire to secure by Letters Patent, is—

A compound of the ingredients herein described, substantially as specified.

In testimony that I claim the above I have hereunto subscribed my name in the presence of two witnesses.

MRS. ELIZABETH PHILLIPS.

Witnesses:
G. W. GABEE,
JOHN S. PHILLIPS.